(12) United States Patent
Fujii et al.

(10) Patent No.: US 11,127,152 B2
(45) Date of Patent: Sep. 21, 2021

(54) INDOOR MONITORING DEVICE (71) Applicant: AISIN SEIKI KABUSHIKI KAISHA, Kariya (JP)

(72) Inventors: Hiroyuki Fujii, Kariya (JP); Godai Tanaka, Anjo (JP); Yoshiaki Tomatsu, Toyoake (JP)

(73) Assignee: AISIN SEIKI KABUSHIKI KAISHA, Kariya (JP)

(*) Notice: Subject to any disclaimer, the term of this patent is extended or adjusted under 35 U.S.C. 154(b) by 9 days.

(21) Appl. No.: 16/578,574

(22) Filed: Sep. 23, 2019

(65) Prior Publication Data
US 2020/0098128 A1 Mar. 26, 2020

(30) Foreign Application Priority Data
Sep. 26, 2018 (JP) .............................. JP2018-180433

(51) Int. Cl.
G06K 9/00 (2006.01)
G06T 7/70 (2017.01)
G06T 7/60 (2017.01)

(52) U.S. Cl.
CPC ............ G06T 7/70 (2017.01); G06K 9/00838 (2013.01); G06T 7/60 (2013.01); *G06T 2207/30196* (2013.01); *G06T 2207/30268* (2013.01)

(58) Field of Classification Search
CPC .............................. G06T 7/70; G06K 9/00838
USPC ......................................................... 382/103
See application file for complete search history.

(56) References Cited

U.S. PATENT DOCUMENTS

2008/0021616 A1* 1/2008 Aoki ................. B60R 21/01552
701/45
2019/0039546 A1* 2/2019 Elangovan ........... G07C 9/0069

FOREIGN PATENT DOCUMENTS

| JP | 2014-092965 A | 5/2014 |
| JP | 2014-211734 A | 11/2014 |
| JP | 2016-007919 A | 1/2016 |

* cited by examiner

*Primary Examiner* — Stephen P Coleman
(74) *Attorney, Agent, or Firm* — Oblon, McClelland, Maier & Neustadt, L.L.P.

(57) ABSTRACT

An indoor monitoring device includes: an image obtainment unit obtaining a captured image obtained by imaging an inside of a cabin of a vehicle by an imaging unit; and a position detection unit determining whether or not an occupant's head is present in the captured image, detecting a size of the head, a head position of the head, and a key point position of a key point other than the head of the occupant in the captured image in a case where the head is present in the captured image, and detecting a seating position of the occupant in the cabin based on the size of the head, the head position, and the key point position.

10 Claims, 5 Drawing Sheets

INDOOR MONITORING DEVICE

CROSS REFERENCE TO RELATED APPLICATIONS

This application is based on and claims priority under 35 U.S.C. § 119 to Japanese Patent Application 2018-180433, filed on Sep. 26, 2018, the entire contents of which are incorporated herein by reference.

TECHNICAL FIELD

An embodiment of this disclosure relates to an indoor monitoring device.

BACKGROUND DISCUSSION

Techniques for detecting the number of occupants who have entered a cabin and the number of occupants going out of the cabin or detecting an occupant in the cabin based on a captured image obtained by an imaging unit imaging the inside of the cabin of a vehicle have been developed.

However, it is difficult to accurately estimate the position of an object in a three-dimensional space such as the cabin by using the imaging unit that does not have a distance measurement function for measuring the distance to an object. Although the above-described techniques are techniques for obtaining information on an occupant in a cabin by using the single imaging unit having no distance measurement function, it is difficult to detect the occupant's seating position in both front-rear and left-right directions.

Thus, a need exists for an indoor monitoring device which is not susceptible to the drawback mentioned above.

SUMMARY

An indoor monitoring device of an embodiment includes, as an example, an image obtainment unit obtaining a captured image obtained by imaging an inside of a cabin of a vehicle by an imaging unit, and a position detection unit determining whether or not an occupant's head is present in the captured image, detecting a size of the head, a head position of the head, and a key point position of a key point other than the head of the occupant in the captured image in a case where the head is present in the captured image, and detecting a seating position of the occupant in the cabin based on the size of the head, the head position, and the key point position. Accordingly, as an example, it is possible to detect the seating position of the occupant in the cabin with high accuracy by using the single imaging unit that has no distance measurement function.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view illustrating an example of a state where a part of the cabin of a vehicle equipped with an indoor monitoring device according to the present embodiment is seen through;

DETAILED DESCRIPTION

An exemplary embodiment disclosed here will be disclosed below. The configuration of the following embodiment and the actions, results, and effects provided by the configuration are an example. The embodiment disclosed here can be realized by a configuration other than the configuration disclosed in the following embodiment, and at least one of various effects based on the basic configuration and derivative effects can be obtained.

A vehicle equipped with an indoor monitoring device according to the present embodiment may be an automobile (internal combustion engine automobile) having an internal combustion engine (engine) as a drive source, an automobile (such as an electric vehicle and a fuel cell vehicle) having an electric motor (motor) as a drive source, or an automobile (hybrid car) having both an internal combustion engine and an electric motor as drive sources. In addition, the vehicle can be equipped with various transmission devices and various devices (such as systems and components) necessary for driving an internal combustion engine or an electric motor. In addition, a device related to driving a vehicle wheel of the vehicle can be variously set in terms of method, number, layout, and the like.

Figure 1:
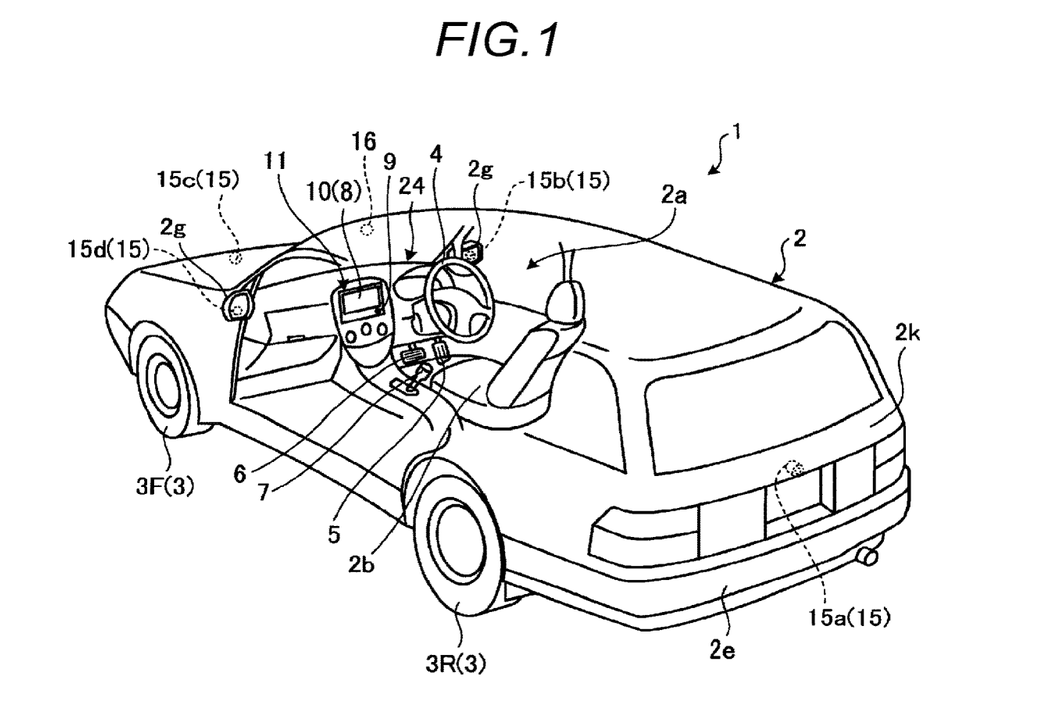

FIG. 1 is a perspective view illustrating an example of a state where a part of the cabin of the vehicle equipped with the indoor monitoring device according to the present embodiment is seen through. As illustrated in FIG. 1, a vehicle 1 is provided with a vehicle body 2, a steering unit 4, an acceleration operation unit 5, a braking operation unit 6, a shift operation unit 7, and a monitor device 11. The vehicle body 2 has a cabin 2*a* that an occupant enters.

Seats 2*b*, 2*h*, 2*i*, and 2*j* on which an occupant in the cabin 2*a* sits are provided in the cabin 2*a*. The seat 2*b* is a seat on which a driver sits as an occupant. The seat 2*h* is a passenger seat provided next to the seat 2*b*, which is a driver's seat. The seats 2*i* and 2*j* are rear seats provided behind the seats 2*b* and 2*h*.

In addition, the steering unit 4, the acceleration operation unit 5, the braking operation unit 6, the shift operation unit 7, and the like are provided in the cabin 2*a* in a state where a driver as an occupant faces the seat 2*b*. The steering unit 4 is, for example, a steering wheel projecting from a dashboard 24. The acceleration operation unit 5 is, for example, an accelerator pedal positioned under a driver's foot. The braking operation unit 6 is, for example, a brake pedal positioned under a driver's foot. The shift operation unit 7 is, for example, a shift lever projecting from a center console.

The monitor device 11 is provided in, for example, the middle portion of the dashboard 24 in the width direction (that is, the left-right direction) of the vehicle. The monitor device 11 may have a function of a navigation system, an audio system, or the like. The monitor device 11 has a display device 8, a voice output device 9, and an operation input unit 10. In addition, the monitor device 11 may have various operation input units such as a switch, a dial, a joystick, and a push button.

A liquid crystal display (LCD), an organic electroluminescent display (OELD), or the like constitutes the display device 8 capable of displaying various images based on image data. A speaker or the like constitutes the voice output device 9 outputting various voices based on voice data. The voice output device 9 may be provided at a different position other than the monitor device 11 in the cabin 2a.

A touch panel or the like constitutes the operation input unit 10 allowing an occupant to input various types of information. In addition, the operation input unit 10 is provided on the display screen of the display device 8 and is capable of transmitting an image displayed on the display device 8. As a result, the operation input unit 10 allows an occupant to visually recognize an image displayed on the display screen of the display device 8. The operation input unit 10 receives the input of various types of information by an occupant by detecting a touch operation that the occupant performs on the display screen of the display device 8.

Figure 2:
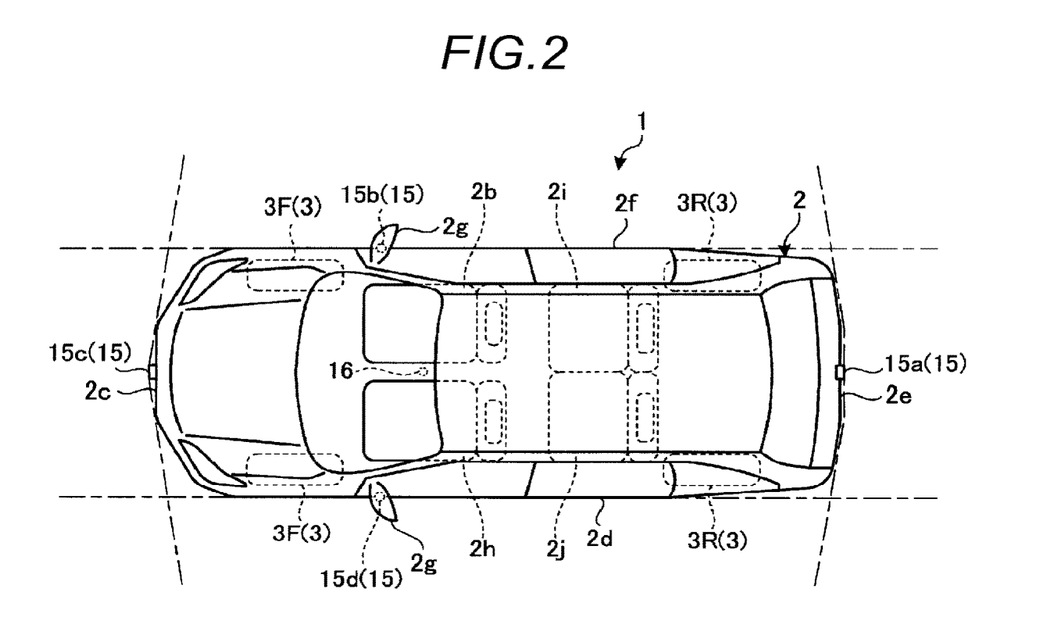
FIG. 2 is a plan view of an example of the vehicle according to the present embodiment.

FIG. 2 is a plan view of an example of the vehicle according to the present embodiment. As illustrated in FIGS. 1 and 2, the vehicle 1 is a four-wheeled vehicle or the like and has two (left and right) front wheels 3F and two (left and right) rear wheels 3R. All or some of the four vehicle wheels 3 are steerable.

The vehicle 1 is equipped with a plurality of imaging units 15 (in-vehicle cameras). In the present embodiment, the vehicle 1 is equipped with, for example, four imaging units 15a to 15d. The imaging unit 15 is a digital camera having an imaging element such as a charge coupled device (CCD) and a CMOS image sensor (CIS). The imaging unit 15 is capable of imaging the surroundings of the vehicle 1 at a predetermined frame rate. The imaging unit 15 outputs a captured image obtained by the surroundings of the vehicle 1 being imaged. Each of the imaging units 15 has a wide-angle lens or a fisheye lens and is capable of imaging, for example, a range of 140° to 220° in the horizontal direction. In addition, the optical axis of the imaging unit 15 may be set obliquely downward.

Specifically, the imaging unit 15a is positioned in, for example, a rear end portion 2e of the vehicle body 2 and is provided in a wall portion below the rear window of a rear hatch door 2k. The imaging unit 15a is capable of imaging the region behind the vehicle 1 among the surroundings of the vehicle 1. The imaging unit 15b is positioned in, for example, a right end portion 2f of the vehicle body 2 and is provided on a door mirror 2g on the right side. The imaging unit 15b is capable of imaging the region beside the vehicle 1 among the surroundings of the vehicle 1. The imaging unit 15c is positioned on the front side of the vehicle body 2 or the like, that is, in a front end portion 2c in the front-rear direction of the vehicle 1 or the like. The imaging unit 15c is provided on a front bumper, a front grill, or the like. The imaging unit 15c is capable of imaging the region in front of the vehicle 1 among the surroundings of the vehicle 1. The imaging unit 15d is positioned on the left side of the vehicle body 2 or the like, that is, in a left end portion 2d in the vehicle width direction or the like. The imaging unit 15d is provided on the door mirror 2g on the left side. The imaging unit 15d is capable of imaging the region beside the vehicle 1 among the surroundings of the vehicle 1.

In addition, as illustrated in FIGS. 1 and 2, an in-vehicle camera 16 (imaging unit) is provided in the cabin 2a. The in-vehicle camera 16 is provided so as to be capable of imaging the inside of the cabin 2a. In the present embodiment, the in-vehicle camera 16 is provided so as to be capable of imaging the entire inside of the cabin 2a (at least an object on the seats 2b, 2h, 2i, and 2j) from a point in front of the seats 2b, 2h, 2i, and 2j. In addition, in the present embodiment, the in-vehicle camera 16 is an infrared camera and is capable of imaging the inside of the cabin 2a at a predetermined frame rate. The in-vehicle camera 16 outputs an IR image (hereinafter, referred to as a captured image) obtained by the inside of the cabin 2a being imaged. Although an IR camera is used as the in-vehicle camera 16 in the present embodiment, the embodiment disclosed here is not limited thereto insofar as the in-vehicle camera 16 is an imaging unit capable of imaging the entire inside of the cabin 2a. For example, the in-vehicle camera 16 may be a visible light camera.

Figure 3:
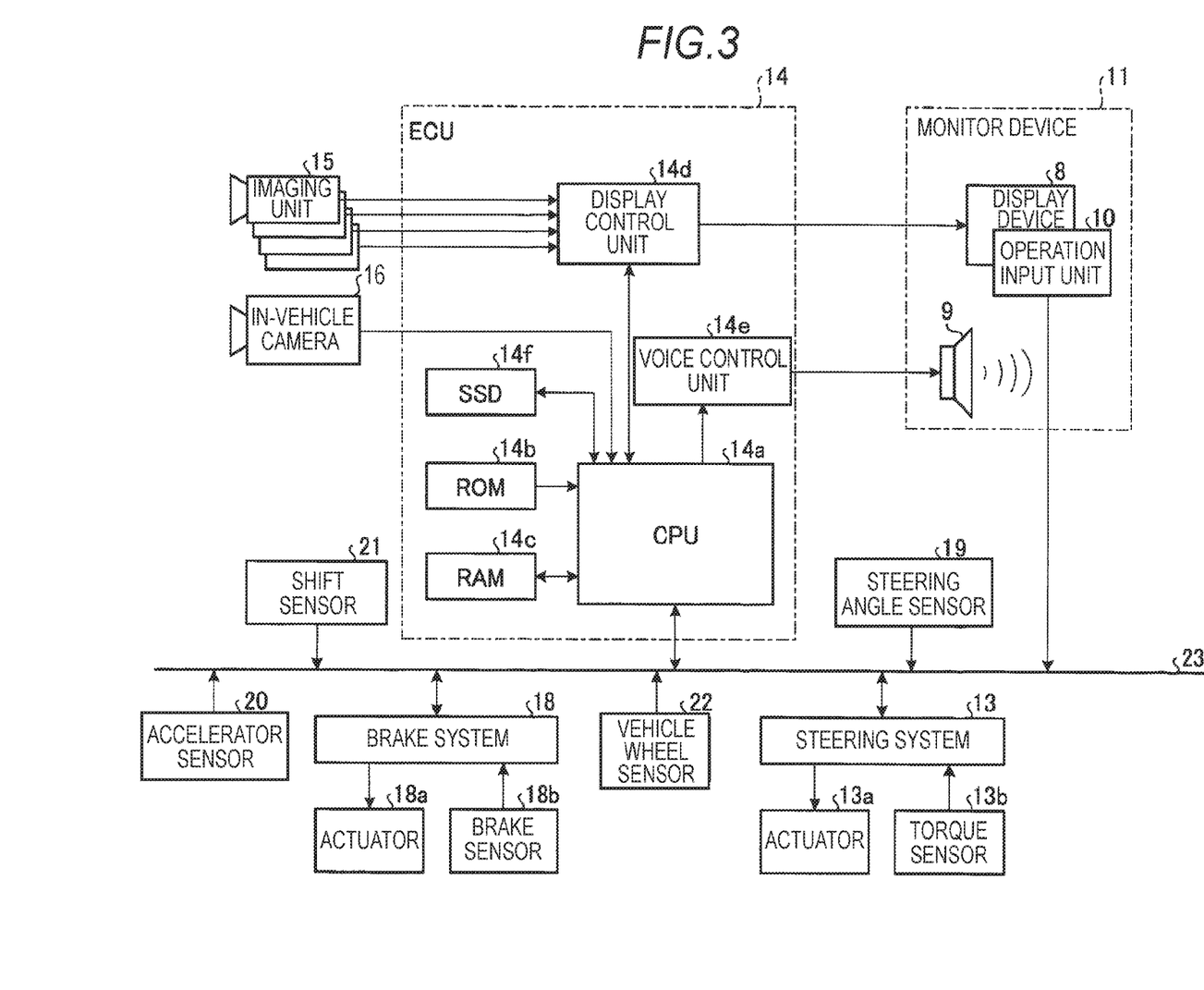
FIG. 3 is a block diagram illustrating an example of the functional configuration of the vehicle according to the present embodiment.

FIG. 3 is a block diagram illustrating an example of the functional configuration of the vehicle according to the present embodiment. As illustrated in FIG. 3, the vehicle 1 is provided with a steering system 13, a brake system 18, a steering angle sensor 19, an accelerator sensor 20, a shift sensor 21, a vehicle wheel sensor 22, an in-vehicle network 23, and an electronic control unit (ECU) 14. The monitor device 11, the steering system 13, the brake system 18, the steering angle sensor 19, the accelerator sensor 20, the shift sensor 21, the vehicle wheel sensor 22, and the ECU 14 are electrically connected via the in-vehicle network 23, which is a telecommunication line. A controller area network (CAN) or the like constitutes the in-vehicle network 23.

The steering system 13 is an electric power steering system, a steer by wire (SBW) system, or the like. The steering system 13 has an actuator 13a and a torque sensor 13b. The steering system 13 steers the vehicle wheel 3 by being electrically controlled by the ECU 14 or the like, operating the actuator 13a, and performing steering force compensation by applying torque to the steering unit 4. The torque sensor 13b detects the torque that a driver gives to the steering unit 4 and transmits the result of the detection to the ECU 14.

The brake system 18 includes an anti-lock brake system (ABS) controlling the lock of the brake of the vehicle 1, an anti-slip device (electronic stability control: ESC) suppressing a side slip of the vehicle 1 during cornering, an electric brake system assisting the brake by brake force enhancement, and a brake by wire (BBW). The brake system 18 has an actuator 18a and a brake sensor 18b. The brake system 18 is electrically controlled by the ECU 14 or the like and applies a braking force to the vehicle wheel 3 via the actuator 18a. The brake system 18 detects, for example, the lock of the brake, the idle rotation of the vehicle wheel 3, and the indication of a side slip from the rotational difference between the left and right vehicle wheels 3 or the like and executes control to suppress the lock of the brake, the idle rotation of the vehicle wheel 3, and a side slip. The brake sensor 18b is a displacement sensor detecting the position of the brake pedal as a movable portion of the braking operation unit 6 and transmits the result of the brake pedal position detection to the ECU 14.

The steering angle sensor 19 is a sensor detecting the amount of steering of the steering unit 4 such as the steering wheel. In the present embodiment, a Hall element or the like constitutes the steering angle sensor 19 detecting the rotation angle of the rotating part of the steering unit 4 as the steering amount and transmitting the result of the detection to the ECU 14. The accelerator sensor 20 is a displacement sensor detecting the position of the accelerator pedal as a movable portion of the acceleration operation unit 5 and transmits the result of the detection to the ECU 14.

The shift sensor 21 is a sensor detecting the position of a movable portion (such as a bar, an arm, and a button) of the shift operation unit 7 and transmits the result of the detection to the ECU 14. The vehicle wheel sensor 22, which has a Hall element or the like, is a sensor detecting the amount of rotation of the vehicle wheel 3 and the number of rotations of the vehicle wheel 3 per unit time and transmits the result of the detection to the ECU 14.

A computer or the like constitutes the ECU 14 responsible for overall control of the vehicle 1 by means of hardware-software cooperation. Specifically, the ECU 14 is provided with a central processing unit (CPU) 14a, a read only memory (ROM) 14b, a random access memory (RAM) 14c, a display control unit 14d, a voice control unit 14e, and a solid state drive (SSD) 14f. The CPU 14a, the ROM 14b, and the RAM 14c may be provided in the same circuit board.

The CPU 14a reads a program stored in a non-volatile storage device such as the ROM 14b and executes various types of arithmetic processing in accordance with the program. For example, the CPU 14a executes image processing with respect to image data to be displayed on the display device 8, processing for detecting an occupant's seating position based on a captured image obtained by the in-vehicle camera 16, and the like.

The ROM 14b stores, for example, various programs and parameters necessary for executing the programs. The RAM 14c temporarily stores various data used in the operation at the CPU 14a. The display control unit 14d mainly executes, for example, image processing with respect to image data obtained from the imaging unit 15 and output to the CPU 14a and conversion of image data obtained from the CPU 14a into display image data to be displayed on the display device 8 among the arithmetic processing at the ECU 14. The voice control unit 14e mainly executes processing of a voice obtained from the CPU 14a and output to the voice output device 9 among the arithmetic processing at the ECU 14. The SSD 14f, which is a rewritable non-volatile storage unit, keeps storing data obtained from the CPU 14a even in a case where the ECU 14 is turned off.

Figure 4:
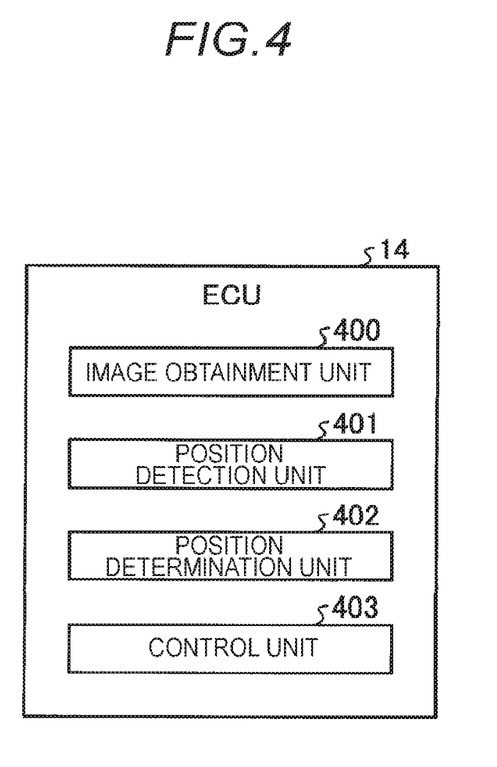
FIG. 4 is a block diagram illustrating an example of the functional configuration of an ECU of the vehicle according to the present embodiment.

FIG. 4 is a block diagram illustrating an example of the functional configuration of the ECU of the vehicle according to the present embodiment. As illustrated in FIG. 4, the ECU 14 is provided with an image obtainment unit 400, a position detection unit 401, a position determination unit 402, and a control unit 403. The ECU 14 realizes the functions of the image obtainment unit 400, the position detection unit 401, the position determination unit 402, and the control unit 403 by, for example, a processor such as the CPU 14a mounted on a circuit board executing a periphery monitoring program stored in a storage medium such as the ROM 14b and the SSD 14f. Hardware such as a circuit may partially or wholly constitute the image obtainment unit 400, the position detection unit 401, the position determination unit 402, and the control unit 403. In the present embodiment, the ECU 14 functions as an example of the indoor monitoring device.

The image obtainment unit 400 obtains a captured image obtained by the in-vehicle camera 16 imaging the entire inside of the cabin 2a.

The position detection unit 401 determines whether or not an occupant's head is present in the captured image obtained by the image obtainment unit 400. In a case where it is determined that an occupant's head is present in the captured image, the position detection unit 401 detects the size of the occupant's head, the position of the occupant's head (hereinafter, referred to as a head position), and the position of a key point other than the occupant's head (hereinafter, referred to as a key point position) in the captured image.

Here, the key point is a preset non-head point in the occupant's body. For example, the key points are the occupant's joint position (such as neck, shoulder, elbow, wrist, hip joint, and knee) and the occupant's crown or chest.

Next, the position detection unit 401 detects the occupant's seating position in the cabin 2a based on the size of the occupant's head, the occupant's head position, and the key point position. As a result, the seating position of an occupant in the cabin 2a can be detected with high accuracy, even in a case where the occupant's seating position is detected by means of a captured image obtained by the inside of the cabin 2a being imaged by the in-vehicle camera 16 that does not have a distance measurement function for measuring the distance to an object, since the positions of the occupant in the cabin 2a in both of the front-rear and left-right directions can also be detected.

In addition, there is no need to install in the cabin 2a a plurality of cameras such as a camera for imaging an occupant seated in the front seat (seats 2b and 2h) and a camera for imaging an occupant seated in the rear seat (2i and 2j) and there is no need to provide a camera having a distance measurement function such as a time of flight (TOF) camera in addition to the in-vehicle camera 16, and thus the system for detecting the seating position of an occupant in the cabin 2a can be reduced in size and cost.

Specifically, the position detection unit 401 detects the seating position of the occupant in the cabin 2a in the left-right direction based on the head position and the key point position. As a result, the seating position of the occupant in the cabin 2a in the left-right direction can be detected with high accuracy. In the present embodiment, in a case where the position detection unit 401 detects the seating position of the occupant seated in the front seat (seats 2b and 2h), the position detection unit 401 detects whether the occupant is seated on the left side or the right side as the seating position in the left-right direction. In addition, in a case where the position detection unit 401 detects the seating position of the occupant seated in the rear seat (seats 2i and 2j), the position detection unit 401 detects whether the occupant is seated on the left side, in the middle, or on the right side as the seating position in the left-right direction.

Although an example in which the position detection unit 401 detects two seating positions (such as the left side and the right side) or three seating positions (such as the left side, the middle, and the right side) as the left-right-direction seating positions of an occupant in the cabin 2a is described in the present embodiment, the embodiment disclosed here is not limited thereto and four or more seating positions can be detected as the left-right-direction seating positions in the cabin 2a.

In addition, specifically, the position detection unit 401 detects the front-rear-direction seating position of an occupant in the cabin 2a based on the presence or absence of the key point and the size of his or her head in a captured image. As a result, the front-rear-direction seating position of an occupant in the cabin 2a can be detected with high accuracy. In the present embodiment, the position detection unit 401 detects whether an occupant is seated in the front seat (seats 2b and 2h) or the rear seat (seats 2i and 2j) in the cabin 2a as the front-rear-direction seating position.

Although an example in which the position detection unit 401 detects two seating positions (such as the front seat and the rear seat) as the front-rear-direction seating positions of an occupant in the cabin 2a is described in the present embodiment, the embodiment disclosed here is not limited thereto and three or more seating positions can be detected as the front-rear-direction seating positions in the cabin 2a.

In addition, the position detection unit 401 detects the front-rear-direction position of the seat 2b, 2h, 2i, or 2j in which an occupant is seated (hereinafter, referred to as a seat position) based on the size of the head of the occupant (seating position-detected occupant) in a captured image. In the present embodiment, the position detection unit 401 pre-stores a seat position table in a storage medium such as the RAM 14c. Associated in the seat position table for each of the seats 2b, 2h, 2i, and 2j are the seat positions to which the seats 2b, 2h, 2i, and 2j can be moved and the reference sizes of the head at the seat positions (hereinafter, referred to as reference sizes).

The position detection unit 401 detects, as the seat position of the seat in which an occupant is seated, the seat position stored in association with the reference size corresponding to the occupant's head size among the reference sizes of the seat detected as the occupant's seating position in the seat position table. As a result, a more detailed position of an occupant in the cabin 2a can be detected, and thus control processing for the vehicle 1 related to the position of the occupant can be executed with high accuracy.

Further, the position detection unit 401 detects an occupant's posture based on the size of the head of the occupant (seating position-detected occupant) in a captured image. In the present embodiment, the position detection unit 401 detects that an occupant is bent forward in a case where the occupant's head size exceeds the upper limit of the reference size of the seat detected as the occupant's seating position in the seat position table.

The position detection unit 401 detects that an occupant is in a supine state in a case where the occupant's head size is exceeded by the lower limit of the reference size of the seat detected as the occupant's seating position in the seat position table. As a result, a more detailed position of an occupant in the cabin 2a can be detected, and thus control processing for the vehicle 1 related to the position of the occupant in the cabin 2a can be executed with high accuracy.

In a case where a seat belt worn by a seating position-detected occupant is detected from a captured image, the position determination unit 402 determines the detected seating position as the occupant's seating position until the occupant alights. After an occupant sits on a seat and wears a seat belt, the occupant is unlikely to move to another seat and the seating position is unlikely to change. Even if the occupant's seating position detected by means of a captured image temporarily changes due to a change in the posture of the occupant or the like after the seat belt worn by the occupant is detected from the captured image, the possibility of returning to the original seating position is high.

Accordingly, in a case where a seat belt worn by a seating position-detected occupant is detected from a captured image, the position determination unit 402 determines the detected seating position as the occupant's seating position until the occupant alights. As a result, in a case where a seat belt worn by a seating position-detected occupant is detected from a captured image, it is possible to prevent the occupant's seating position from being erroneously detected due to a temporary change in the occupant's posture until the occupant alights.

The control unit 403 executes control processing for the vehicle 1 related to an occupant's position based on the occupant's seating position detected by the position detection unit 401. In the present embodiment, the control unit 403 executes airbag control processing, seat belt reminder control processing, and the like based on an occupant's seating position detected by the position detection unit 401.

Figure 5:
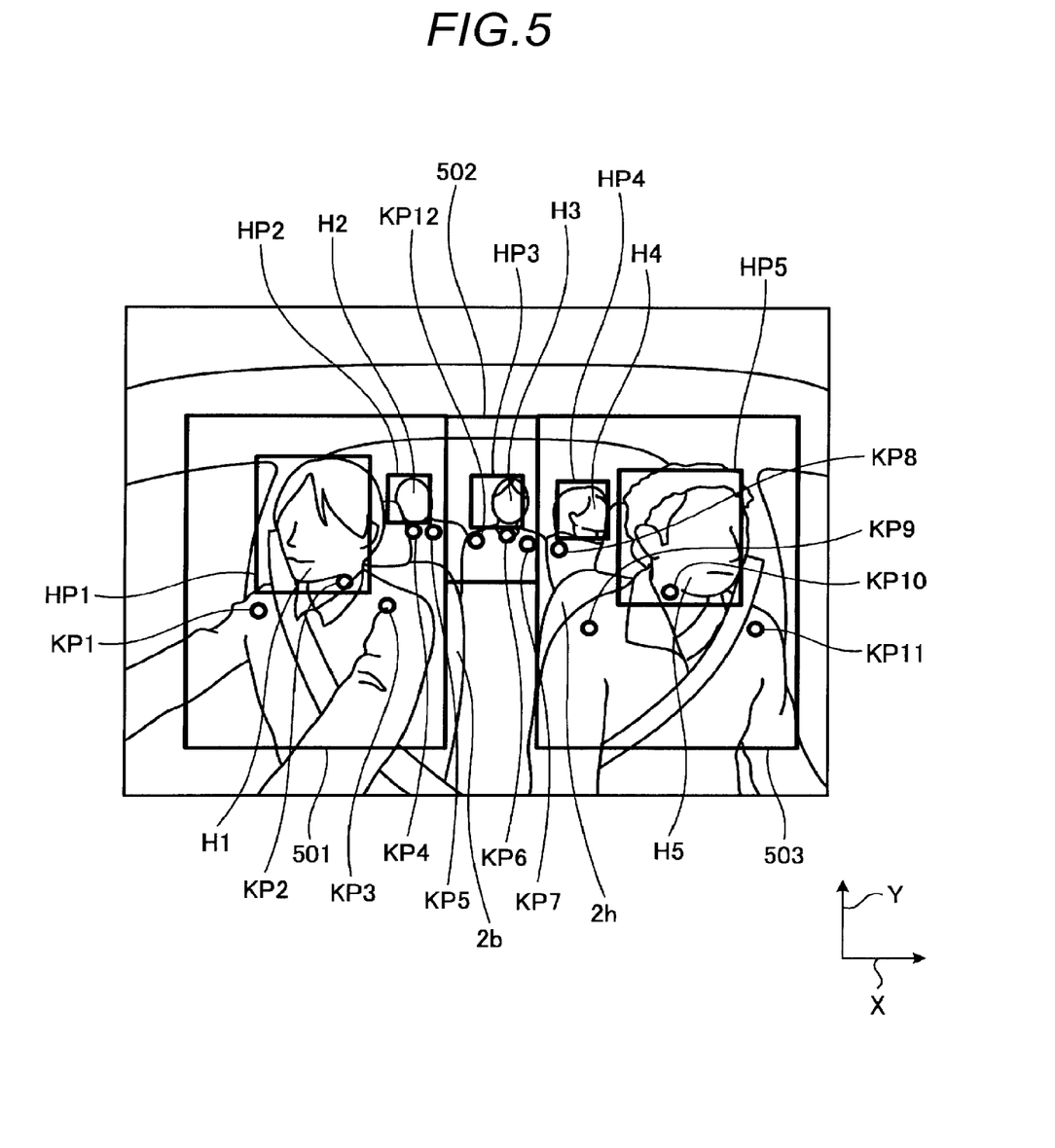
FIG. 5 is a diagram illustrating an example of the processing that the vehicle according to the present embodiment executes in order to detect an occupant's seating position.

Next, an example of the processing that the vehicle 1 according to the present embodiment executes in order to detect an occupant's seating position will be described with reference to FIG. 5. FIG. 5 is a diagram illustrating an example of the processing that the vehicle according to the present embodiment executes in order to detect an occupant's seating position. In a captured image 500 illustrated in FIG. 5, the vertical axis is the Y axis and the horizontal axis is the X axis.

In the present embodiment, the captured image 500 is obtained by the image obtainment unit 400 and then the position detection unit 401 sets, with respect to the obtained captured image 500, determination regions 501 to 503 corresponding to seating position candidates in the cabin 2a as illustrated in FIG. 5. Although three determination regions 501 are set with respect to the captured image 500 in the present embodiment, the embodiment disclosed here is not limited thereto and one determination region, two determination regions, or four or more determination regions may be set with respect to the captured image 500.

Here, the determination regions 501 to 503 are regions for determining whether or not an occupant's head is present. The determination region 501 is a region corresponding to the driver's seat (seat 2b) and the rear seat (right side and middle) as seating position candidates. The determination region 502 is a region corresponding to the rear seat (right side, middle, and left side) as a seating position candidate. The determination region 503 is a region corresponding to the passenger seat (seat 2h) and the rear seat (left side and middle) as seating position candidates.

Next, the position detection unit 401 detects occupant heads H1 to H5 from each of the determination regions 501 to 503 by image processing. In other words, the position detection unit 401 determines whether or not occupant heads H1 to H5 are present in each of the determination regions 501 to 503. Then, the position detection unit 401 determines whether or not an occupant has entered the cabin 2a based on the presence or absence of the heads H1 to H5 in each of the determination regions 501 to 503.

In a case where the heads H1 to H5 are present in the determination regions 501 to 503, the position detection unit 401 detects head positions HP1 to HP5 and the sizes of the heads H1 to H5 and the occupant's key point positions KP1 to KP12 in the captured image 500 by image processing.

In the present embodiment, the position detection unit 401 detects head coordinates as the head positions HP1 to HP5 of the heads H1 to H5. The head coordinates are the coordinates of the heads H1 to H5 in an XY coordinate system in which the vertical axis of the captured image 500 is the X axis and the horizontal axis of the captured image 500 is the X axis. In addition, in the present embodiment, the position detection unit 401 detects key point position coordinates, which are the coordinates of key points in the XY coordinate system, as the key point positions KP1 to KP12.

In a case where the plurality of heads H1 and H2 are detected from the determination region 501 as illustrated in FIG. 5, the position detection unit 401 selects a candidate for the occupant's seating position for each of the plurality of heads H1 and H2 from the seating position candidates corresponding to the determination region 501 (driver's seat, rear seat right side, and rear seat middle) based on the sizes of the heads H1 and H2, the head positions HP1 and HP2, and the key point positions KP1 to KP5 and detects the selected seating position candidate as the occupant's seating position.

Specifically, the position detection unit 401 detects the driver's seat as the occupant's seating position corresponding to the head H1 among the driver's seat and the rear seat (right side and middle), which are seating position candidates, since the head H1 is larger in size than the head H2 and the key point positions KP1 to KP3 of the occupant to which the head H1 belongs are not hidden by the seat 2b as illustrated in FIG. 5. In the present embodiment, the position detection unit 401 determines that the head H1 is larger in size than the head H2 in a case where the size of the head H1 exceeds the size of the head H2 by a predetermined threshold value or more. Here, the predetermined threshold value is a head size difference at which it is determined that front-rear-direction seating positions differ from each other.

The position detection unit 401 detects the right side of the rear seat as the occupant's seating position corresponding to the head H2 among the driver's seat and the rear seat (right side and middle), which are seating position candidates, since the head H1 is larger in size than the head H2 and only the key point positions KP4 and KP5 on the left side of the occupant to which the head H2 belongs are detected (that is, the key point position on the right side of the occupant to which the head H2 belongs is hidden by the seat 2b) as illustrated in FIG. 5. In the present embodiment, the position detection unit 401 determines that the head H2 is smaller in size than the head H1 in a case where the size of the head H2 is exceeded by the size of the head H1 by a predetermined threshold value or more.

Although not illustrated, even in a case where the plurality of heads H1 and H5 of the same size are detected from the determination region 501, the position detection unit 401 selects the occupant seating position candidates of the respective heads from the driver's seat and the rear seat (middle and right side), which are seating position candidates corresponding to the determination region 501, based on the respective head positions HP1 and HP5 and key point positions KP1 to KP3 and KP9 to KP11 of the plurality of heads H1 and H5 and detects the selected seating position candidates as occupant seating positions.

In this case, the key point positions KP1 to KP3 and KP9 to KP11 of the occupants respectively having the plurality of heads H1 and H5 are hidden by no seat, and thus it is impossible to detect the left-right-direction seating positions of the occupants having the heads H1 and H5 based on a key point position hidden by the seat. Accordingly, the position detection unit 401 detects the left-right-direction seating positions of the occupants having the heads H1 and H5 based on the positional relationship between the head position HP1 and the key point positions KP1 to KP3 of the occupant having the head H1 and the head position HP5 and the key point positions KP9 to KP11 of the occupant having the head H5.

Specifically, the occupant having the head H1 is likely to be positioned to the right of the occupant having the head H5 in a case where the head position HP1 and the key point positions KP1 to KP3 of the occupant having the head H1 are present to the left of the head position HP5 and the key point positions KP9 to KP11 of the occupant having the head H5 in the captured image 500. In this case, the position detection unit 401 detects the driver's seat as the seating position of the occupant having the head H1. As for the seating position of the occupant having the head H5, the passenger seat present to the left of the driver's seat is detected as the seating position.

In addition, in a case where the head H3 is detected from the determination region 502 as illustrated in FIG. 5, the position detection unit 401 selects a candidate for the seating position of the occupant having the head H3 from the seating position candidates corresponding to the determination region 502 (rear seat right side, middle, and left side) based on the head position HP3 and the key point positions KP6, KP7, and KP12 and detects the selected seating position candidate as an occupant seating position.

Specifically, the position detection unit 401 detects the middle of the rear seat as the occupant's seating position corresponding to the head H3 in the rear seat (right side, middle, and left side), which is a seating position candidate, since the key point positions KP6, KP7, and KP12 of the occupant having the head H3 are hidden neither by the seat 2b nor by the seat 2h as illustrated in FIG. 5.

Although not illustrated, in a case where a plurality of heads of the same size are detected from the determination region 502, the position detection unit 401 selects the occupant seating position candidates of the respective heads from the seating position candidates corresponding to the determination region 502 (rear seat right side, middle, and left side) based on the respective head positions and key point positions of the plurality of heads and detects the selected seating position candidates as occupant seating positions.

For example, in a case where the head position and the key point position of one head are present to the left of the head position and the key point position of the other head and the key point position on the right side of the occupant having the one head is hidden by the seat 2b in the captured image 500 (that is, in a case where the key point position on the right side of the occupant having the one head is not detected), the position detection unit 401 detects the right side of the rear seat as the seating position of the occupant having the one head.

In addition, in a case where, for example, the head position and the key point position of one head are present to the right of the head position and the key point position of the other head and the key point position on the left side of the occupant having the one head is hidden by the seat 2h in the captured image 500 (that is, in a case where the key point position on the left side of the occupant having the one head is not detected), the position detection unit 401 detects the left side of the rear seat as the seating position of the occupant having the one head.

Further, in a case where the plurality of heads H4 and H5 are detected from the determination region 503 as illustrated in FIG. 5, the position detection unit 401 selects a candidate for the occupant's seating position for each of the plurality of heads H4 and H5 from the seating position candidates corresponding to the determination region 503 (passenger seat, rear seat middle, and rear seat left side) based on the sizes of the heads H4 and H5, the head positions HP4 and HP5, and the key point positions KP8 to KP11 and detects the selected seating position candidate as the occupant's seating position.

Specifically, the position detection unit 401 detects the passenger seat as the occupant's seating position corresponding to the head H5 among the passenger seat and the rear seat (middle and left side), which are seating position candidates, since the head H5 is larger in size than the head H4 and the key point positions KP9 to KP11 of the occupant to which the head H5 belongs are not hidden by the seat 2h as illustrated in FIG. 5. In the present embodiment, the position detection unit 401 determines that the head H5 is larger in size than the head H4 in a case where the size of the head H5 exceeds the size of the head H4 by a predetermined threshold value or more.

The position detection unit 401 detects the left side of the rear seat as the occupant's seating position corresponding to the head H4 among the passenger seat and the rear seat (left side and middle), which are seating position candidates, since the head H5 is larger in size than the head H4 and only the key point position KP8 on the right side of the occupant to which the head H4 belongs is detected (that is, the key point position on the left side of the occupant to which the head H4 belongs is hidden by the seat 2h) as illustrated in FIG. 5. In the present embodiment, the position detection unit 401 determines that the head H2 is smaller in size than the head H1 in a case where the size of the head H2 is exceeded by the size of the head H1 by a predetermined threshold value or more.

Although not illustrated, even in a case where the plurality of heads H1 and H5 of the same size are detected from the determination region 503, the position detection unit 401 selects the occupant seating position candidates of the respective heads from the passenger seat and the rear seat (middle and left side), which are seating position candidates corresponding to the determination region 503, based on the respective head positions HP1 and HP5 and key point positions KP1 to KP3 and KP9 to KP11 of the plurality of heads H1 and H5 and detects the selected seating position candidates as occupant seating positions.

In this case, the key point positions KP1 to KP3 and KP9 to KP11 of the occupants respectively having the plurality of heads H1 and H5 are hidden by no seat, and thus it is impossible to detect the left-right-direction seating positions of the occupants having the heads H1 and H5 based on a key point position hidden by the seat. Accordingly, the position detection unit 401 detects the left-right-direction seating positions of the occupants having the heads H1 and H5 based on the positional relationship between the head position HP1 and the key point positions KP1 to KP3 of the occupant having the head H1 and the head position HP5 and the key point positions KP9 to KP11 of the occupant having the head H5.

Specifically, the occupant having the head H5 is likely to be positioned to the left of the occupant having the head H1 in a case where the head position HP5 and the key point positions KP9 to KP11 of the occupant having the head H5 are present to the right of the head position HP1 and the key point positions KP1 to KP3 of the occupant having the head H1 in the captured image 500. In this case, the position detection unit 401 detects the passenger seat as the seating position of the occupant having the head H5. As for the seating position of the occupant having the head H5, the passenger seat present to the right of the passenger seat is detected as the seating position as described above.

Figure 6:
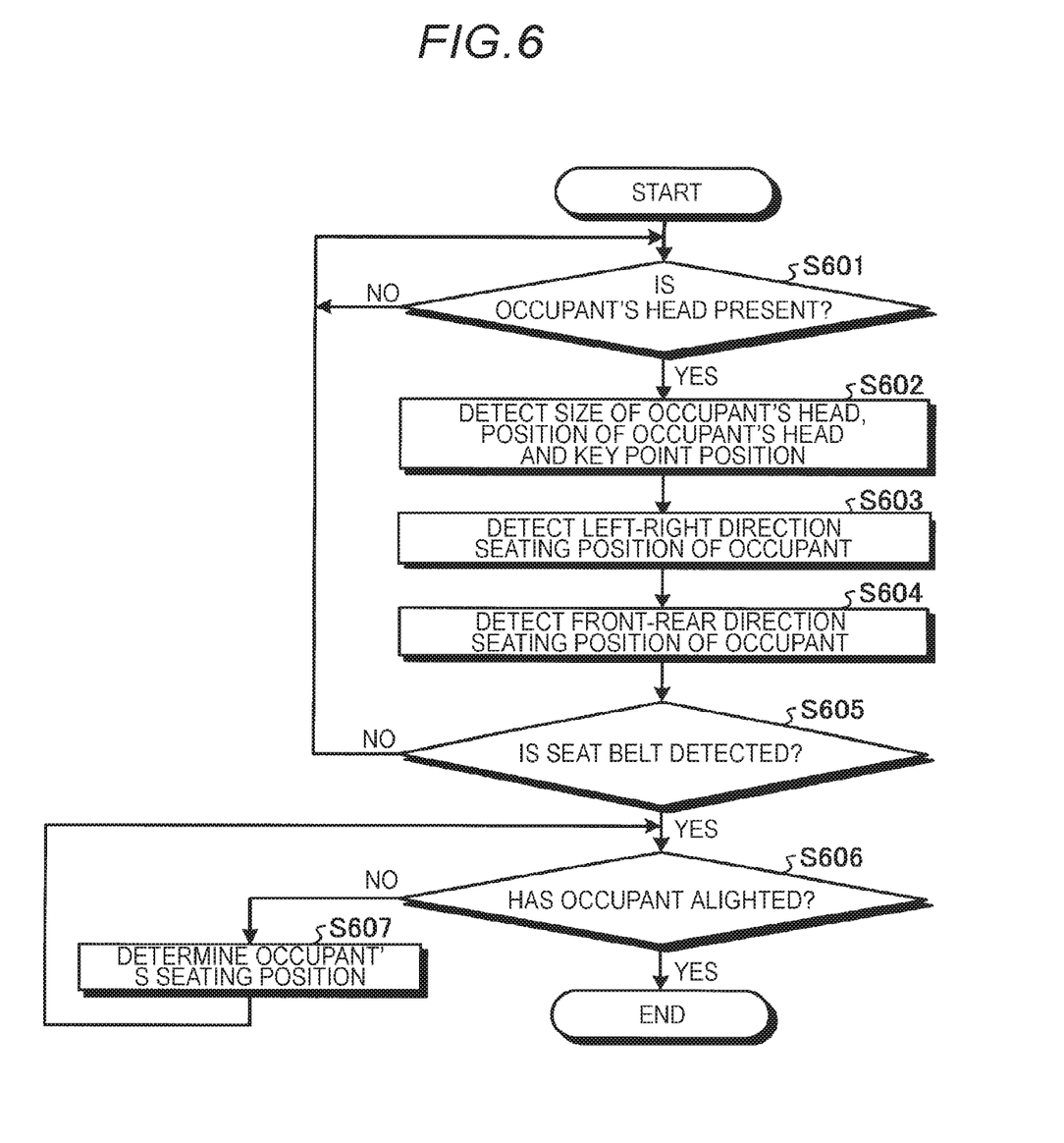
FIG. 6 is a flowchart illustrating an example of the flow of the processing that the vehicle according to the present embodiment executes in order to detect an occupant's seating position.

Next, an example of the flow of the processing that the vehicle 1 according to the present embodiment executes in order to detect an occupant's seating position will be described with reference to FIG. 6. FIG. 6 is a flowchart illustrating an example of the flow of the processing that the vehicle according to the present embodiment executes in order to detect an occupant's seating position.

When a captured image is obtained by the image obtainment unit 400, the position detection unit 401 determines whether or not an occupant's head is present in the obtained captured image (Step S601). In a case where an occupant's head is not present in the obtained captured image (Step S601: No), the position detection unit 401 waits until the image obtainment unit 400 obtains a new IR image.

In a case where an occupant's head is present in the captured image (Step S601: Yes), the position detection unit 401 detects the size and the position of the occupant's head and the key point position in the captured image (Step S602).

Then, the position detection unit 401 detects the left-right-direction seating position of the occupant in the cabin 2a based on the head position and the key point position in the captured image (Step S603). Further, the position detection unit 401 detects the front-rear-direction seating position of the occupant in the cabin 2a based on the size of the head and the presence or absence of the key point in the captured image (Step S604).

When the occupant's seating position is detected by the position detection unit 401, the position determination unit 402 detects a seat belt worn by the seating position-detected occupant from the captured image (Step S605).

In a case where the seat belt worn by the seating position-detected occupant is not detected (Step S605: No), the position determination unit 402 determines that the occupant's seating position is likely to change and returns to Step S601 without determining the occupant's seating position.

In a case where the seat belt worn by the seating position-detected occupant is detected (Step S605: Yes), the position determination unit 402 determines whether or not the occupant has alighted by using the captured image (Step S606).

In a case where it is determined that the occupant has not alighted (Step S606: No), the position determination unit 402 determines the detected occupant seating position as the occupant's seating position (Step S607) and returns to Step S606. Here, in a case where the occupant's seating position is already determined, the position determination unit 402 maintains the determination of the occupant's seating position.

In a case where it is determined that the occupant has alighted (Step S606: Yes), the position determination unit 402 resets the occupant seating position detection result and ends the occupant seating position detection processing.

As described above, according to the vehicle 1 of the present embodiment, the seating position of an occupant in the cabin 2a can be detected with high accuracy, even in a case where the occupant's seating position is detected by means of a captured image obtained by the inside of the cabin 2a being imaged by the in-vehicle camera 16 that does not have a distance measurement function for measuring the distance to an object, since the positions of the occupant in the cabin 2a in both of the front-rear and left-right directions can also be detected.

In addition, according to the vehicle 1 of the present embodiment, there is no need to install in the cabin 2a a plurality of cameras such as a camera for imaging an occupant seated in the front seat (seats 2b and 2h) and a camera for imaging an occupant seated in the rear seat (2i and 2j) and there is no need to provide a camera having a distance measurement function such as a time of flight (TOF) camera in addition to the in-vehicle camera 16, and thus the system for detecting the seating position of an occupant in the cabin 2a can be reduced in size and cost.

In the indoor monitoring device of the embodiment, as an example, the position detection unit may set, with respect to the captured image, a determination region corresponding to candidates for the seating position, determine whether or not the head is present in the determination region, and in a case where the head is present in the determination region, select a candidate for the seating position of the occupant having the head from the candidates for the seating position corresponding to the determination region based on the size of the head, the head position, and the key point position and detect the selected candidate for the seating position as the seating position.

Accordingly, as an example, it is possible to detect the seating position of the occupant in the cabin with high accuracy by using the single imaging unit that has no distance measurement function.

In the indoor monitoring device of the embodiment, as an example, the position detection unit may detect the seating position of the occupant in the cabin in a left-right direction based on the head position and the key point position. Accordingly, as an example, the left-right-direction seating position of the occupant in the cabin can be detected with high accuracy.

In the indoor monitoring device of the embodiment, as an example, the position detection unit may detect the seating position of the occupant in the cabin in a front-rear direction based on the size of the head and the presence or absence of the key point. Accordingly, as an example, the front-rear-direction seating position of the occupant in the cabin can be detected with high accuracy.

As an example, the indoor monitoring device of the embodiment may further include a determination unit determining, in a case where a seat belt worn by the occupant whose seating position has been detected is detected from the captured image, the detected seating position as the occupant's seating position until the occupant alights. Accordingly, as an example, it is possible to prevent the occupant's seating position from being erroneously detected due to a temporary change in the occupant's posture until the occupant alights in a case where the seat belt worn by the seating position-detected occupant is detected from the captured image.

In the indoor monitoring device of the embodiment, as an example, the position detection unit may further detect a front-rear-direction seat position of a seat on which the occupant is seated based on the size of the head of the occupant whose seating position has been detected. Accordingly, as an example, control processing for the vehicle related to the occupant's position can be executed with high accuracy.

In the indoor monitoring device of the embodiment, as an example, the position detection unit may further detect an occupant's posture based on the size of the head of the occupant whose seating position has been detected. Accordingly, as an example, control processing for the vehicle related to the occupant's position in the cabin can be executed with high accuracy.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An indoor monitoring device comprising:
   an image obtainment unit obtaining a captured image obtained by imaging an inside of a cabin of a vehicle by an imaging unit; and
   a position detection unit determining whether or not an occupant's head is present in the captured image, detecting a size of the head, a head position of the head, and a key point position of a key point other than the head of the occupant in the captured image in a case where the head is present in the captured image, and detecting a seating position of the occupant in the cabin based on the size of the head, the head position, and the key point position, wherein
   the position detection unit sets, with respect to the captured image, a determination region corresponding to candidates for the seating position, determines whether or not the head is present in the determination region, and in a case where the head is present in the determination region, selects a candidate for the seating position of the occupant having the head from the candidates for the seating position corresponding to the determination region based on the size of the head, the head position, and the key point position and detects the selected candidate for the seating position as the seating position.

2. The indoor monitoring device according to claim 1, wherein
   the position detection unit detects the seating position of the occupant in the cabin in a front-rear direction based on the size of the head and the presence or absence of the key point.

3. The indoor monitoring device according to claim 1, further comprising
   a determination unit determining, in a case where a seat belt worn by the occupant whose seating position has been detected is detected from the captured image, the detected seating position as the occupant's seating position until the occupant alights.

4. The indoor monitoring device according to claim 1, wherein
   the position detection unit detects the seating position of the occupant in the cabin in a left-right direction based on the head position and the key point position.

5. The indoor monitoring device according to claim 4, wherein
   the position detection unit detects the seating position of the occupant in the cabin in a front-rear direction based on the size of the head and the presence or absence of the key point.

6. The indoor monitoring device according to claim 4, further comprising
   a determination unit determining, in a case where a seat belt worn by the occupant whose seating position has been detected is detected from the captured image, the detected seating position as the occupant's seating position until the occupant alights.

7. The indoor monitoring device according to claim 4, wherein
   the position detection unit further detects a front-rear-direction seat position of a seat on which the occupant is seated based on the size of the head of the occupant whose seating position has been detected.

8. The indoor monitoring device according to claim 4, wherein
   the position detection unit further detects an occupant's posture based on the size of the head of the occupant whose seating position has been detected.

9. The indoor monitoring device comprising:
   an image obtainment unit obtaining a captured image obtained by imaging an inside of a cabin of a vehicle by an imaging unit; and
   a position detection unit determining whether or not an occupant's head is present in the captured image, detecting a size of the head, a head position of the head, and a key point position of a key point other than the head of the occupant in the captured image in a case where the head is present in the captured image, and detecting a seating position of the occupant in the cabin based on the size of the head, the head position, and the key point position, wherein the position detection unit further detects a front-rear-direction seat position of a seat on which the occupant is seated based on the size of the head of the occupant whose seating position has been detected.

10. An indoor monitoring device comprising:

an image obtainment unit obtaining a captured image obtained by imaging an inside of a cabin of a vehicle by an imaging unit; and a position detection unit determining whether or not an occupant's head is present in the captured image, detecting a size of the head, a head position of the head, and a key point position of a key point other than the head of the occupant in the captured image in a case where the head is present in the captured image, and detecting a seating position of the occupant in the cabin based on the size of the head, the head position, and the key point position, wherein the position detection unit further detects an occupant's posture based on the size of the head of the occupant whose seating position has been detected.

\* \* \* \* \*